United States Patent
Manganaro et al.

(10) Patent No.: US 6,444,130 B1
(45) Date of Patent: Sep. 3, 2002

(54) PROCESS FOR RENDERING WASTE FROM ELECTRIC FURNACE PRODUCTION OF PHOSPHORUS NON-HAZARDOUS

(75) Inventors: James L. Manganaro, Princeton; Henry A. Pfeffer, Mercerville, both of NJ (US); Jay R. Brummer, Pocatello, ID (US); Bert D. McMunn, Naples, FL (US); Christopher M. Knapp, Wausau; William M. Copa, Schofield, both of WI (US)

(73) Assignee: FMC Properties,LLC., Philadelphia, PA (US)

( * ) Notice: Subject to any disclaimer, the term of this patent is extended or adjusted under 35 U.S.C. 154(b) by 23 days.

(21) Appl. No.: 09/699,762

(22) Filed: Oct. 30, 2000

(51) Int. Cl.$^7$ .................................................. C02F 1/02
(52) U.S. Cl. ....................... 210/750; 210/761; 210/766; 210/806; 210/906; 210/912
(58) Field of Search ............................... 210/750, 758, 210/761, 766, 806, 906, 912

(56) References Cited

U.S. PATENT DOCUMENTS

| | | | |
|---|---|---|---|
| 3,650,686 A | * | 3/1972 | Hudson et al. |
| 3,945,919 A | | 3/1976 | Schindewolf ................ 210/50 |
| 4,372,929 A | * | 2/1983 | Barber |
| 4,383,847 A | * | 5/1983 | Barber |
| 4,689,154 A | * | 8/1987 | Zimberg |
| 4,812,243 A | | 3/1989 | Brandenburg et al. ...... 210/761 |
| 5,192,453 A | | 3/1993 | Keckler et al. ............. 210/761 |
| 5,368,741 A | | 11/1994 | Munday et al. ............. 210/724 |
| 5,397,482 A | | 3/1995 | Castrantas et al. .......... 210/759 |
| 5,409,617 A | | 4/1995 | Ross et al. .................. 210/762 |

FOREIGN PATENT DOCUMENTS

EP 0349035 1/1990

OTHER PUBLICATIONS

S. J. Robuck and R.G. Luthy, *Water Science Technology*, 21(6–7), 547–58 (1989).
T.C. Tan and W.K. Teo, *Plating and Surface Finishing*, 74(4), 70–73 (1987).
H.L. Robey, *Plating and Surface Finishing*, 70(6), 79–82 (1983).
G.W. Heise and H.E. Foote, J. of Industrial and Engineering Chemistry, 4(12), 331–336 (1920).
H.L. Robey and R.G.W. Laughlin, Annual Tech. Conf., Am. Electroplating Soc., San Francisco, Paper C–2 (1982).
M. Mider et al., *Environmental Progress*, 11(4), 251–255 (1992).
J. R. van Wager, Phosphorus and its Compounds, vol. 1, Wiley, 1958, pp. 355–367.
F. M. Kimmerle et al, Light Metals 1989, 118 TMS Annual Meeting, Las Vegas, Nevada, 1989, pp. 387–394.

* cited by examiner

*Primary Examiner*—Betsey Morrison Hoey

(57) ABSTRACT

The invention is a process for treating waste slurry generated in the electric furnace production of phosphorus in which a superatmospheric reactor is operated at an elevated temperature to destroy cyanides, phosphorus, and phosphides present in the waste. The process transforms wastes from the phosphorus electric furnace process into non-hazardous solid, liquid, and gaseous wastes that meet environmental regulatory requirements regarding solids for phosphorous, cyanide, phosphine and cyanide flux, and TCLP metals, and regarding the filtrate for UTS metals.

27 Claims, 7 Drawing Sheets

PROCESS FOR RENDERING WASTE FROM ELECTRIC FURNACE PRODUCTION OF PHOSPHORUS NON-HAZARDOUS

FIELD OF THE INVENTION

This invention relates to the production of phosphorus by the electric furnace method. In particular this invention relates to a process in which superatmospheric reactors are operated at elevated temperatures to render non-hazardous the waste from the electric furnace production of phosphorus.

BACKGROUND OF THE INVENTION

Elemental phosphorus (P4) is produced commercially by the reduction of phosphate ore in an electric furnace. This process produces two primary waste streams: (a) precipitator slurry, and (b) clarifier underflow.

In the electric furnace process a mixture of calcium phosphate, usually as phosphate shale; carbon, such as coke; and sand (silica, $SiO_2$) flux is charged into an electric furnace and the contents heated to melting temperatures, generally about 3000° F. (about 1650° C.). The phosphate is reduced by the carbon reductant to elemental phosphorus, which is evolved as a vapor from the molten reaction mass along with carbon monoxide and small amounts of other gases.

Typically two major categories of waste streams are generated by the phosphorus electric furnace process: (a) precipitator slurry, which is produced by the furnace gas cleaning device, often an electrostatic precipitator; and (b) "phossy water waste" streams, which are an emulsion or "sludge" of elemental phosphorus, water and suspended and dissolved solids. These various "phossy water" waste streams can be concentrated into a single clarifier underflow steam. The precipitator slurry and clarifier underflow streams may, if desired, be combined into a single waste stream to be treated.

The gaseous stream from the furnace entrains particles of carbon, phosphate ore, and silica as well as other materials present in the furnace. Some of these particulates are removed from the stream by passing it through a device for separating solids from a gas, such as an electrostatic precipitator. Thus, a precipitator slurry is produced when entrained furnace particles are removed from the electrostatic precipitator and quenched in water. Precipitator slurry typically has a phosphorus content of from about 0.1% to about 1% and a solids content of from about 5% to about 20%.

The phosphorus is recovered from the furnace gases by a phosphorus recovery system. The phosphorus vapor gaseous mixture (mostly, but not completely depleted of insoluble particles) from the precipitator is introduced into a water spray tower. In the spray tower sufficient water is introduced by overhead spray heads to reduce the temperature of the gas below the dew point but above the freezing point (about 44.1° C.) of phosphorus. The phosphorus vapor condenses to liquid globules of phosphorus, which fall to a sump at the bottom of the tower and coalesce to a layer of liquid phosphorus.

In general, phosphorus-containing aqueous wastes are formed wherever phosphorus water and suspended solids come into contact to form an emulsion or "sludge". Phosphorus is typically stored, handled and transported under water to protect it from atmospheric exposure. These aqueous wastes, or "phossy water" as they are commonly referred to, are produced during storage, shipping, and transfer of phosphorus. Phosphorus-containing aqueous wastes originate at various stages in the operation of the plant, such as from the spray tower sump and as a residue in storage tanks. The waste phosphorus occurs mainly as droplets suspended in the aqueous medium of dissolved and suspended solids; very little phosphorus is dissolved because solubility of phosphorus in water is only 3.3 mg/L. Although the phosphorus concentration can vary over wide limits depending on the point of origin, the aqueous waste stream typically contain from about 0.1% to about 3%, more typically about 0.2 to about 0.6% phosphorus.

The phosphorus-containing aqueous wastes from phossy water are processed in a clarifier. Clarifier underflow, a slurry of water, phosphorus, and dissolved and suspended solids, is removed from the bottom of the clarifier.

Precipitator slurry and clarifier underflow contain the following components:

1. Elemental phosphorus, which is pyrophoric and, under alkaline conditions, can release phosphine ($PH_3$) to the ambient air.

2. Cyanide ion ($CN^-$), complexed cyanide, and insoluble cyanides (collectively "cyanides"), which can leach and/or release hydrogen cyanide (HCN) to the ambient air.

3. Metal phosphides, which can gradually release phosphine to the ambient air.

4. Heavy metals, specifically the twelve metals identified in the RCRA Universal Treatment Standards (UTS), incorporated herein by reference: arsenic (As), barium (Ba), cadmium (Cd), chromium (Cr), lead (Pb), mercury (Hg), selenium (Se), silver (Ag), antimony (Sb), beryllium (Be), nickel (Ni), and thallium (Tl). "Metal" refers to the element in either the elemental form or in an form.

The primary components of the precipitator slurry waste stream that require treatment are cyanides, phosphides, and heavy metals. The slurry also contains metals sulfides and selenides, which, if oxidized during waste processing, can cause the associated metals to solubilize. Also, once the selenate anion ($SeO4^{-2}$) has been formed, it is very difficult to remove from solution. The major component of the clarifier underflow waste stream that requires treatment is phosphorus. However, cyanides, phosphides and heavy metals can also be present in the clarifier underflow and, conversely, phosphorus can also be present in the precipitator slurry. Additionally, the stabilized material should not fail EPA SW-846 Method 1030, incorporated herein by reference, and the concentration of phosphine and of hydrogen cyanide above the stabilized material prior to being sent for disposal should not be greater than 0.3 ppm and 10 ppm, respectively.

Various methods have been developed for treating these streams. Munday, U.S. Pat. No. 5,368,741, for example, discloses a process for the disposal of waste generated in the electric furnace manufacture of elemental phosphorus. The process comprises: (a) treating the mixture with lime, whereby the phosphorus is converted in part into salts of phosphorus acids and in part to phosphine while the heavy metal containing particles are rendered non-leachable; (b) collecting the phosphine from (a); and (c) removing the water from the treated aqueous mixture of (a) to produce clarified water and non-leachable solids having a phosphorus content below burning levels. After the reaction is completed, the mixture is dewatered to produce concentrated solids, which are non-leachable when placed in a landfill. However, this process, which is carried out at under relatively mild conditions, does not address the problem of destruction of cyanides and phosphides.

SUMMARY OF THE INVENTION

The invention is a process for treating waste slurry generated in the electric furnace production of phosphorus in which a superatmospheric reactor is operated at an elevated temperature. The process comprises the steps of:

a) heating a mixture of waste slurry and alkali, the waste slurry comprising one or more materials selected from the group consisting of UTS metals, cyanides, elemental phosphorus, and phosphides to produce a treated mixture;

b) cooling the treated mixture and separating the gases formed;

c) treating the gases to remove phosphine;

d) if necessary, adjusting the pH of the treated mixture to at least 11; and e) filtering the treated mixture to produce a wet cake and a filtrate.

In one embodiment of the invention step a) is carried out in the absence of oxygen. In a second embodiment of the invention step a) is carried out in the presence of oxygen. In a third embodiment of the invention step a) is carried out in the absence of oxygen and the mixture is heated a second time in the presence of oxygen.

The process transforms the wastes from the phosphorus electric furnace process into non-hazardous solid, liquid, and gaseous wastes that meet environmental regulatory requirements including limits associated with phosphorus, cyanide, phosphine and cyanide flux, and TCLP metals, and the filtrate for UTS metals and cyanide. The filtrate may require further treatment to meet UTS requirements for soluble cyanide. However, methods for the destruction of soluble cyanides are known in the art.

The invention simultaneously meets all the environmental requirements. Unlike previous processes for treating phosphorus electric furnace waste, this process also addresses cyanide and phosphide removal. Destruction is one way to remove cyanide and/or phosphine from the process. Typically, and preferably, cyanide and/or phosphine are removed by destruction. Phosphine can be removed by, for example, combustion.

In addition, cadmium, antimony, arsenic, and thallium concentrations in the filtrate (principally in the wet air oxidation modification) are controlled by controlling the pH of the filtrate. The process (especially the wet air oxidation modification) also avoids solubilization of selenium as the selenate anion. Also the process insures that the wet cake passes both the TCLP for cadmium and the limit for cyanides.

BRIEF DESCRIPTION OF THE DRAWINGS

The invention can be more fully understood from the following description in connection with the accompanying drawings described as follows.

DETAILED DESCRIPTION OF THE INVENTION

The invention is a process for treating waste slurry generated in the electric furnace production of phosphorus in which a superatmospheric reactor is operated at an elevated temperature. The process can be operated in either batch or continuous mode.

The primary targets for the liquid and solid phases, i.e., filtrate and wet cake, are given below.

|   | Units | Filtrate UTS Limit | Wet Cake (TCLP) UTS Limit in extract |
|---|---|---|---|
| As | mg/L | 1.4 | 5 |
| Ba | mg/L | 1.2 | 21 |
| Cd | mg/L | 0.69 | 0.11 |
| Cr | mg/L | 2.77 | 0.6 |
| Pb | mg/L | 0.69 | 0.75 |
| Hg | mg/L | 0.150 | 0.025 |
| Se | mg/L | 0.82 | 5.7 |
| Ag | mg/L | 0.43 | 0.14 |
| Sb | mg/L | 1.9 | 1.15 |
| Be | mg/L | 0.82 | 1.22 |
| Ni | mg/L | 3.98 | 11 |
| Tl | mg/L | 1.4 | 0.2 |
| V | mg/L | —* | —* |
| Zn | mg/L | —* | —* |
| Total cyanide | mg/L | 1.2 | 590** |
| Amenable cyanide | mg/L | 0.86 | 30** |

*Vanadium has a limit of 4.3 mg/L in the filtrate and 1.6 mg/L in the wet cake extract. Zinc has a limit of 2.6 mg/L in the filtrate and 4.3 mg/L in the wet cake extract. However, these metals are not regulated for the mineral processing industry.
**In the wet cake (in mg/kg).

Three modifications of the process are disclosed:

1) Anoxic treatment, in which alkaline hydrolysis of phosphorus, cyanide and phosphides occurs in the absence of air.

2) Wet air oxidation (WAO) treatment, in which phosphorus and phosphides are oxidized and cyanides are also destroyed.

3) A combination of anoxic treatment, followed by a mild wet air oxidation (WAO) treatment.

Lime treatment of the effluent slurry from the reactor is used, if necessary, to meet UTS metals requirements on the filter wet cake and filtrate. A continuous process or a batch process can be used.

Features of the anoxic modification and WAO modification are:

| Anoxic | WAO |
|---|---|
| Hydrolysis of $P_4$ and phosphides only | Oxidation of $P_4$ and phosphides dominant but some hydrolysis can occur |
| Does not require any $O_2$ transport. | Requires $O_2$ transport from gas into slurry phase |
| CN destruction by hydrolysis | CN destruction by hydrolysis |
| Needs to operate at high pH | Needs to operates at low pH |

| Anoxic | WAO |
|---|---|
| Generates phosphine and hydrogen | Minimizes phosphine and hydrogen generation |
| A very slight residual odor may be present | No residual odor |

Anoxic Modification

Figure 1:
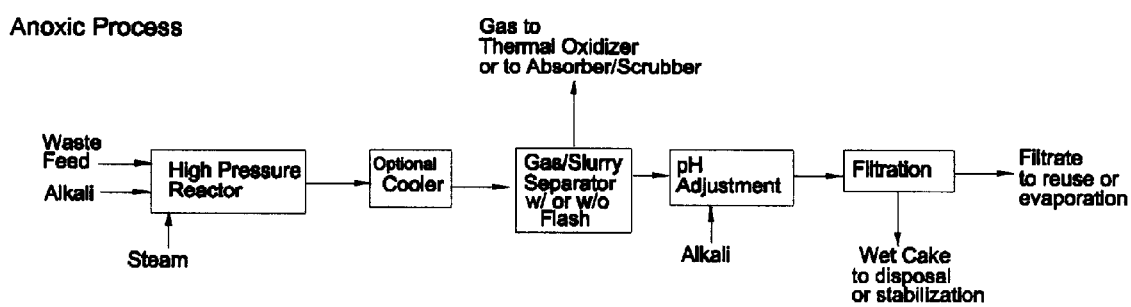
FIG. 1 is a diagram of the anoxic modification.

Referring to FIG. 1, in the anoxic modification a waste feed is fed into a high pressure reactor. The waste feed may comprise precipitator slurry and/or clarifier underflow. Alkali is added to the reactor. The alkali may be added to the reactor separately or it may be mixed with the waste feed prior to its addition to the reactor. The anoxic modification is typically operated above pH 7.

Typically about 1 to 7 lb (0.45 to 3.4 kg) of calcium hydroxide (lime), preferably about 5 lb (2.3 kg) of calcium hydroxide, is used per lb (0.45 kg) of phosphorus present in the waste feed. Although equivalent amounts of other bases, such as sodium hydroxide or potassium hydroxide, can be used in place of calcium hydroxide, calcium hydroxide is preferred, even though it may possibly cause scaling of the reactor. Calcium ion precipitates both fluoride ion and phosphate ion, reducing the concentration of soluble salts in the filtrate.

Reactors that can be used include pipe reactors, vertical column reactors, agitated autoclave vessels, and other reactors with the appropriate configuration that are capable of supporting a high pressure operation. The reactor should be capable of withstanding the pressure generated on heating and should be constructed of a material or materials, such as INCONEL® 600 nickel alloy, which are capable of withstanding the pressure generated during processing and the corrosive feeds.

The reactor can be heated, for example, by direct steam injection, heat exchange, or a combination of these methods. The reaction may also generate some heat. Typically, the reactor is operated at about 160–240° C., preferably at about 210° C., at a pressure of about 150–500 psig, preferably at about 300 psig, for about 0.5–2.0 h, preferably about 1 h. In general, it was found that the reactor should be operated at least about 200° C. to achieve a satisfactory reduction in phosphine concentration in ambient air above the treated wet cake. Because the anoxic modification is carried out in an atmosphere that is essentially free of oxygen, neither air nor oxygen ($O_2$) is added to the reactor in the anoxic modification.

After the reaction is complete, the slurry is cooled, for example, by flashing or by heat exchange. In flashing, the treated slurry is passed through a pressure reducing valve (flash valve). Water vapor flashes off, cooling the slurry.

Gases formed during the reaction along with water vapor are separated in an appropriate vessel. The gas is sent to a condenser, which condenses the water vapor. The remaining gases, which are typically an about 50:50 by volume mixture of phosphine ($PH_3$) and hydrogen ($H_2$), can be sent to a thermal oxidizer (combustor), for example a refractory lined burner. Combustion removes phosphine from the process. It is possible to recover both the heat and the phosphate values from the combustion step. The gas from the combustor is quenched and sent to a gas purification device, which removes particulate material, such as $P_2O_5$, formed by the combustion of phosphine. Phosphoric acid can be recovered from the gas purification device.

The treated slurry has a pH of about 10–12, typically about 10.0–11.0. Lime treatment of the treated slurry from the reactors is used if needed to cause the filtrate to meet requirements for UTS metals and the wet cake to meet the TCLP requirements for UTS metals. Although the filtrate typically will meet the requirements for UTS metals, the pH can be adjusted, if necessary, to at least about 12.0 to 12.5 to meet the requirements for UTS metals.

The treated slurry is filtered. The wet cake from the filtration is non-hazardous and may be sent directly to a landfill. Alternatively, a stabilient, such as cement or cement kiln dust, may be blended in with the wet cake before landfilling.

The filtrate contains dissolved phosphates and potassium ion. The filtrate may be sent, for example, to an evaporation pond. The precipitated salts may be recovered from the pond and landfilled. Alternatively, the filtrate may be sent to a crystallizer where soluble salts may be removed.

Depending on the cyanide concentration of the filtrate and/or the ultimate disposition of the filtrate, the filtrate may or may not require further treatment to destroy soluble cyanides. Such methods are well known. For example, Castrantas, U.S. Pat. No. 5,397,482, discloses treatment of cyanide-containing effluents with Caro's acid.

Wet Air Oxidation (WAO) Modification

The main advantage of the WAO modification over the anoxic modification is that it produces an off gas stream that has only 0–300 ppm phosphine and, therefore, does not necessarily require a combustor. The main disadvantages of the WAO modification are: (a) it is a more complicated system; (b) there is more solubilization of UTS metals in the filtrate, which makes the pH adjustment of the treated slurry more critical; (c) more attention to pH adjustment of the treated slurry to meet the UTS limit for cadmium in the TCLP is required.

Figure 2:
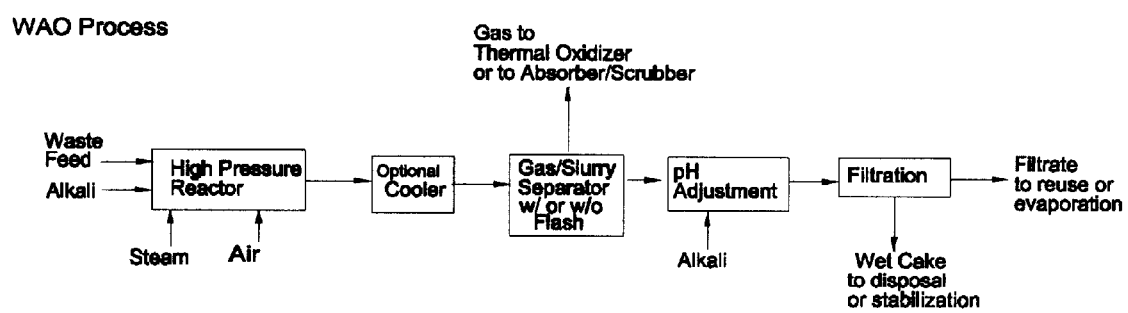
FIG. 2 is a diagram of the wet air oxidation (WAO) modification.

Referring to FIG. 2, in broad terms the WAO modification is similar to the anoxic modification except that oxygen (air) is introduced into the reactor. However, it does differ in detail from the anoxic modification in several important areas. The WAO modification must be operated at a relatively low pH (below pH 7, typically about 4) to prevent oxidation of selenium, which is typically present in the waste slurry in the form of metal selenides, to the water-soluble selenate anion. Once the selenate anion has been formed, it is very difficult to remove from solution. A further reason for operating the WAO modification at low pH is to suppress high concentrations of phosphine and hydrogen in the off gas. Consequently, more lime will generally be needed in the pH adjustment step to suppress solubility of metals such as cadmium, arsenic, antimony and thallium, which have been solubilized as a result of the oxidation. The off gas from the WAO modification will have very low levels of phosphine and hydrogen (on the order of 200 ppm phosphine and 0.1% hydrogen). This gas need not be combusted but could be sent to an absorber or scrubber.

As shown in FIG. 2, in the wet air oxidation modification a waste feed comprising the precipitator slurry and/or the clarifier underflow is fed into a high pressure reactor. Alkali, preferably lime, is added to the waste feed as in the anoxic modification. During the reaction, the pH of the reaction mixture decreases due to the formation of phosphoric acid from the oxidation of phosphorus and phosphides. Typically, the reactor is operated at about 150–230° C., preferably at about 200° C., at a pressure of about 150–500 psig, preferably at about 500 psig, for about 0.5–2.0 h, preferably about 1 h. The reactor offgas may be treated with a scrubber or absorber rather than with a thermal oxidizer.

The treated slurry is acidic, typically at a pH of about 4. Alkali, preferably lime, is added so that the filtrate meets the UTS metals requirements and the wet cake meets the TCLP requirements for UTS metals. The pH is adjusted to about 11, or, if necessary, about 12.0 to 12.5, to meet the requirements for UTS metals, particularly arsenic, cadmium, antimony, and thallium. It may be necessary to increase the pH to about 12 to 12.5 to reduce the concentration of antimony to an acceptable level. After pH adjustment, the treated slurry is filtered. The filtrate and wet cake handled as in the anoxic modification.

Anoxic Treatment Followed by Mild Wet Air Oxidation

The anoxic modification leaves a higher residual concentration of phosphides in the wet cake than the WAO modification when both modifications are operated at the same temperature. However, the concentration of phosphides in the wet cake resulting from either modification is usually not high enough to cause the concentration of phosphine to exceed 0.3 parts per million in the ambient air.

Figure 3:
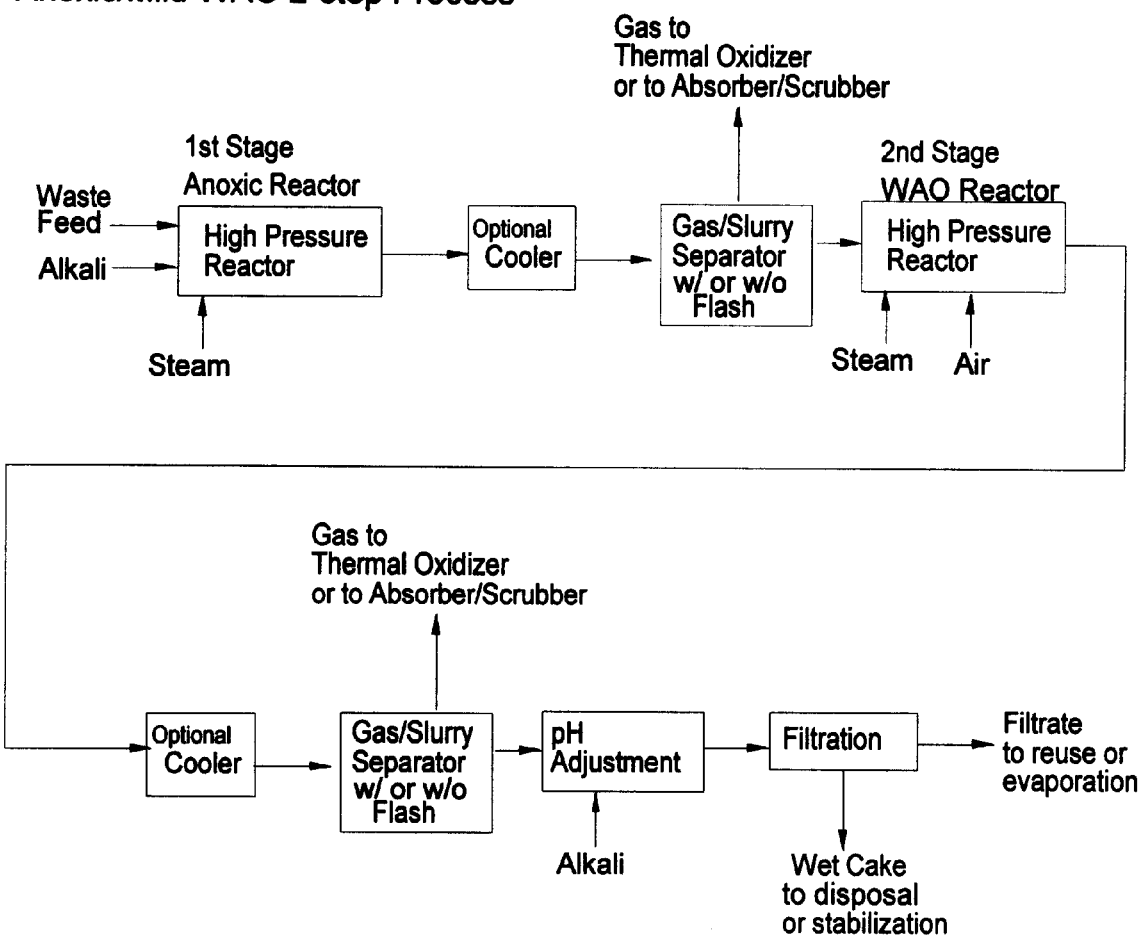
FIG. 3 is a diagram of the anoxic treatment followed by mild wet air oxidation (WAO) modification.

FIG. 3 illustrates a two-step modification, in which an initial anoxic treatment is followed by mild wet air oxidation. The mild WAO step serves to further reduce the concentration of phosphides in the anoxic wet cake. A mild wet air oxidation does not solubilize selenium and the other UTS metals, which can be solubilized in the WAO modification described above. The treated slurry is pH adjusted and handled as in the anoxic modification.

The advantage of this two-step modification is that it permits milder operating conditions for both the anoxic and WAO steps, while destroying the phosphides as effectively as the WAO process without the disadvantage of solubilizing the metals. However, this modification has a higher level of complexity than either the anoxic modification or the WAO modification.

Performance Summary

The performance of the anoxic and WAO modifications is summarized in the following table:

|  | Anoxic | WAO | Targets |
|---|---|---|---|
| Offgas: | | | |
| Phosphine concentration in offgas | 40–60% | 0–400 ppm | — |
| Hydrogen concentration in offgas | 40–60% | ~0.1% | — |
| Hydrogen cyanide concentration in offgas | <10 ppm | <10 ppm | — |
| Effluent Cake*: | | | |
| Amenable cyanide, ppm | 10–30 | 10–30 | 30 |
| Total cyanide, ppm | 10–30 | 10–30 | 590 |
| Phosphine flux, $\mu g/min\text{-}m^2$ | <8 | <8 | 610 |
| Hydrogen cyanide flux, $\mu g/min\text{-}m^2$ | <6 | <6 | 16,200 |
| Phosphides, ppm | 10–80 | 1–10 | — |
| TCLP of wet cake after lime addition | pass | pass | UTS |
| Effluent Filtrate: | | | |
| Amenable cyanide, mg/L | 2–20 | 0.3–20 | 0.86 |
| Total cyanide, mg/L | 2–20 | 0.3–20 | 1.2 |
| UTS metals after lime addition | pass | pass | UTS |

*Prior to cement

The recommended reactor operating conditions and ranges for the anoxic and WAO modifications are:

| Operating Conditions | | Anoxic | | WAO | |
|---|---|---|---|---|---|
| | | Range | Preferred | Range | Preferred |
| Temperature | ° C. | 160–240 | 210 | 150–230 | 200 |
| Pressure | psig | 150–500 | 300 | 150–500 | 500 |
| Actual Residence Time | min | 30–120 | 60 | 30–120 | 60 |
| Lime Dosage | Lb of lime per lb of phosphorus | 1–7 | 5 | 1–7 | 5 |
| Effluent pH | — | 7–12.5 | 10.0–11.0 | 2.0–7.0 | 4.0–5.0 |
| Oxygen in offgas | % | na | na | 10–18 | 12–16 |

The recommended reactor operating conditions and ranges for the anoxic followed by mild WAO modification are:

| Operating Conditions | | First Stage Anoxic | | Second Stage Mild WAO | |
|---|---|---|---|---|---|
| | | Range | Preferred | Range | Preferred |
| Temperature | ° C. | 150–200 | 160 | 100–200 | 130 |
| Pressure | psig | 150–500 | 300 | 150–500 | 150 |
| Actual Residence Time | min | 30–120 | 60 | 30–120 | 30 |
| Lime Dosage | Lb of lime per lb of phosphorus | 1–7 | 5 | 0–3 | 0 |
| Effluent pH | — | 7.0–12.5 | 10.0–11.0 | 2–9 | 4.5–8.5 |
| Oxygen in offgas | % | na | na | 8–18 | 12–16 |

INDUSTRIAL APPLICABILITY

The process provides an economical means of meeting all environmental requirements on the solid and liquid waste streams produced by the production of phosphorus by the electric furnace process. The process renders the effluent solids non-hazardous with respect to: (a) EPA SW-846 Method 1030, incorporated herein by reference, (generally requiring a phosphorus content in the solids of <100 mg/kg); (b) cyanide (solids generally must contain <30 mg/kg amenable cyanide and <590 mg/kg total cyanide); and (c) phosphine generating ability (the rate of phosphine generation, if there is any measurable rate, is sufficiently low that a reading of >0.3 parts per million by volume phosphine will not be observed in the air above a quantity of the solids), and the solid (d) passes the TCLP test for UTS metals leachability. The filtrate or supernatant liquid of the slurry is also non-hazardous with respect to UTS metals.

Although not being bound by any theory or explanation, it is believed that in the anoxic modification, cyanides, phosphorus, and phosphides are destroyed by hydrolysis. Little or no oxidation takes place because little or no oxygen is present in the reactor. The modification needs to operate at high pH. Phosphine and hydrogen are produced in this modification. The phosphine concentration in the ambient air must be reduced to 0.3 parts per million or less so a means for destroying phosphine or otherwise removing it from the reactor off gas is required. With regard to the wet cake, it has been estimated that if the phosphine flux is less than 612 g/min/m$^2$, the phosphine concentration in the ambient air at the berm of a typical landfill will be less than the allowable limit of 0.3 parts per million.

In the wet air oxidation modification, although some hydrolysis may occur, oxidation of phosphorus and phosphides is believed to be the dominant process. Oxygen transport from the gas phase into the slurry phase can be a problem. The modification operates at a low pH to prevent solubilization of selenium. Little phosphine and hydrogen is produced. The anoxic modification with an offgas combustor is the preferred modification. The anoxic modification is a simpler modification because it does not require efficient transfer of oxygen into a slurry. Without proper pH control, irreversible solubilization of selenium can occur in the WAO modification. Production of hydrogen in the reactor in the presence of air in WAO modification introduces a potential flammability and/or explosion problem. The WAO modification requires more pH adjustment than the anoxic modification. It addition, it was observed that the wet cake from the WAO modification appeared to be more prone to from pools of water than did the anoxic modification wet cake. The two-step modification, anoxic treatment followed by mild wet air oxidation, is a more complicated modification than either the anoxic modification or the WAO modification.

Throughout this specification, examples, and claims, all parts and percentages are by weight and all temperatures are in centigrade (C), unless the context indicates otherwise.

The advantageous properties of this invention can be observed by reference to the following examples, which illustrate but do not limit the invention.

EXAMPLES

Definitions

Amenable cyanide and total cyanide—Amenable cyanide is that fraction of the total cyanide that is "amenable to chlorination." Amenable cyanides include free cyanides (such as potassium cyanide) and all metal cyanide complexes except the most strongly bound metallocyanide complexes. Total cyanide includes all cyanides: amenable and non-amenable. Amenable cyanides include those of: Cr(II), Ni(II), Cu(I), Ag(I), Au(I), Zn(II) and Cd(II). Inert (or non-amenable) cyanides include those of Cr(III), Fe(II), Fe(III), Co(III) and Mo(IV). The waste from the phosphorus furnace typically contains little or no non-amenable cyanide.

Phosphine Reactivity by the Head Space Test—This test indicates the total amount reactive phosphorus (both elemental phosphorus and phosphides) present in a sample. The test consists of adding a specified amount of pH 7.2 buffer solution to a specified amount of sample and heating to 140° F. (60° C.) for 30 minutes. The head space is then sampled for phosphine.

Residence time, actual—Calculated from the reactor volume divided by the total volumetric flow including waste slurry, lime slurry and condensate from stream. This can be corrected or uncorrected for thermal expansion of water. Correction for thermal expansion will typically result in a ~17% reduction of calculated residence time.

Residence time, nominal—Calculated from the reactor volume divided by the volumetric flow of only waste slurry and lime slurry. Does not include condensate from stream. This was not corrected for the thermal expansion of water.

TLCP Test—Toxicity Characteristics Leaching Procedure (see EPA publication SW-846, Test Method 1311). In this test, 'extraction fluid #2,' which is a 0.57% acetic acid solution, is ordinarily used. About 100 g of sample is mixed with 20 times its weight of the acetic acid solution. After 18 hr, the supernatant fluid is analyzed for the UTS metals.

TDS—Total dissolved solids TI—(Toluene insolubles)—This number is obtained when the phosphorus concentration in a sample is determined. It literally means all material not extracted by toluene. The value represents total solids, i.e., suspended plus dissolved solids, in the sample.

Total phosphine by Acid Test or "Phosphine Reactivity"—This test indicates the amount of phosphides in the sample. It is conducted by subjecting the sample to digestion in boiling 12N sulfuric acid and measuring the amount of phosphine evolved. The evolved phosphine is collected in potassium hydroxide impregnated carbon tubes.

The following examples are based (a) on pilot scale continuous operation at ~7–16 gph of waste feed and (b) on batch 750 mL autoclave lab data.

Material Balances

The material balances across the continuous pilot scale reactor (In versus Out) at pilot demonstration conditions are summarized below. The material balances indicate that across the reactor: (a) good material closure; (b) a high degree of destruction of phosphorus, phosphides, and cyanides; and (c) an increase in the TDS level in the filtrate.

| | Anoxic (demo run) | WAO (demo run) |
| --- | --- | --- |
| Total material accounted for, % | 94 | 97 |
| Phosphorus destruction, % | 100 | 100 |
| Cyanide ion destruction, % | 96–99 | 96–98 |
| Phosphide destruction, % | 95 | 99 |
| Suspended solids gained, % | 1 | −6 (loss) |
| TDS gained, % | 40 | 50 |

Anoxic Modification

Figure 4:
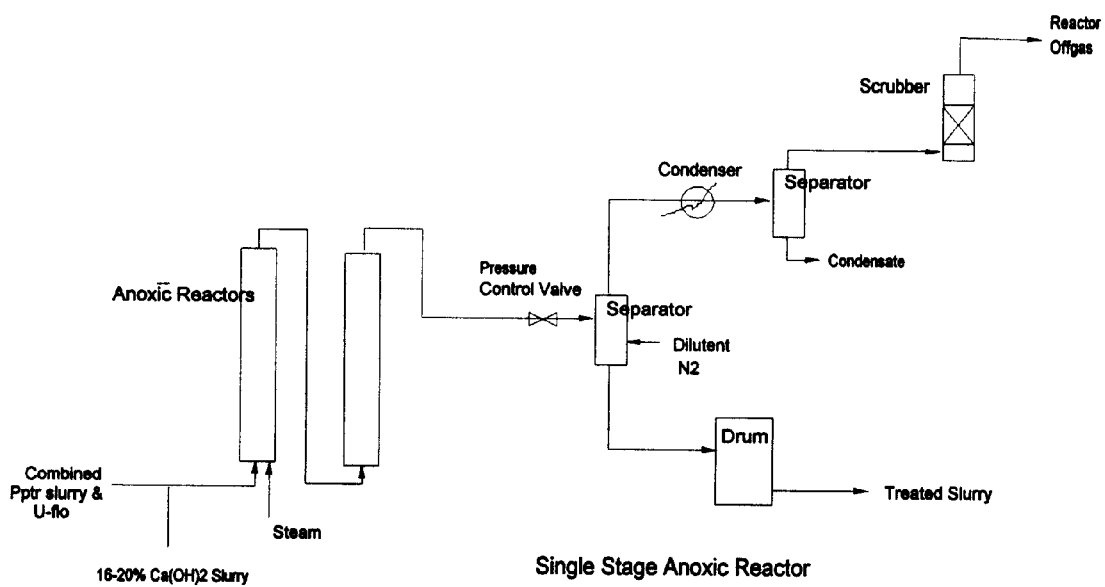
FIG. 4 shows a flowsheet for one embodiment of the anoxic modification.

FIG. 4 shows the flowsheet for the pilot unit anoxic continuous modification. Two reactors in series were used to allow a greater feed slurry flow rate. This produced a greater fluidizing velocity, which reduced solids accumulation in the reactors. The first reactor had a height of 12.5 ft with an internal diameter of 3.67 inches (nominal 6.9 gallon hold up volume) and was constructed of INCONEL® 600 nickel alloy. The second reactor was 18 ft high and had an internal diameter of 3.433 inches (nominal 9.0 gallons hold up capacity). With the two reactors in series, the system hold up volume was 16 gallons.

Each reactor was vertically oriented. Larger solid particles, which were not elutriated by the vertical flow of slurry, accumulated in the bottom of the reactors. Periodically, generally about every 24 hr, the reactors were blowndown of the large solid particles accumulating at the bottom. These particles were typically found to be acceptable with respect to cyanide and phosphorus. If stirred tank reactors were used instead of unstirred vertical flow reactors, the blowdown requirement could be avoided.

Slurry along with entrained gas generated in the first reactor of the pilot unit exited the top of the first reactor and entered the bottom of the second reactor. Steam was injected into the bottom of the second reactor to maintain temperature. The treated slurry exited the top of the second reactor through a pressure control valve, which maintained the desired system pressure. The pressure control valve let down the three phase mixture into a flash separator. Diluent nitrogen gas was injected into the separator just downstream of the pressure control valve to maintain hydrogen and phosphine concentrations in the gas phase as measured downstream of the condenser at 25% of each lower explosive limit, LEL. For hydrogen this was 1% and for phosphine this was 4500 ppm. This dilution with nitrogen was done for the sake of safe operation of the pilot scale unit. A commercial unit, however, could be designed to safely handle undiluted reactor offgas. Treated slurry accumulated in the flash separator and was periodically discharged into a receiving drum. The gas stream proceeded to a cooler where water vapor was condensed. From the cooler the gas stream entered a hypocholorite scrubber to remove phosphine. After phosphine removal, the gas stream then vented to atmosphere. Water that condensed in the coolers was accumulated in a receiving vessel and was periodically discharged into a bucket. All materials either entering or exiting the anoxic system were weighed and analyzed for material balance purposes.

A series of screening runs were preformed in which the effect of residence time, temperayure and lime dosage on wet cake and filtrate were studied. The feed compositionts for those runs are reported in Table 1.

TABLE 1

| | | | | Feed Composition | | | |
|---|---|---|---|---|---|---|---|
| Example No. | pH | Density g/mL | Phosphorus wt % | Phosphine Acid Test mg/L | Total cyanide on slurry basis (Bi) mg/L | TI Slurry Basis wt % | TDS filtrate basis wt % |
| 1 | 8.3 | 1.195 | 8.79 | 1101 | 224 | 27 | 3.9 |
| 2 | 7.8 | 1.116 | 2.32 | 892 | 659 | 17.5 | 3.8 |
| 3 | 9.7 | 1.063 | 1.04 | 700 | 874 | 10 | 2.6 |
| 4 | 9.3 | 1.065 | 1.31 | 610 | 821 | 10 | 2.7 |
| 5 | 8.5 | 1.074 | 1.42 | 555 | 575 | 11 | 2.7 |
| 6 | 9.8 | 1.077 | 1.84 | 684 | 660 | 12.2 | 2.7 |
| 7 | 9.0 | 1.098 | 1.99 | 599 | 316 | 14 | 3.4 |
| 8 | 9.7 | 1.077 | 1.71 | 530 | 31 | 12 | 3.6 |
| 9 | 10.1 | 1.085 | 1.76 | 684 | 398 | 13 | 3.4 |
| 10 | 10.0 | 1.082 | 2.02 | 590 | 374 | 12 | 3.1 |
| 11 | 9.8 | 1.096 | 1.53 | 774 | 516 | 13 | 3.2 |

Operating conditions and wet cake data of these runs are reported in Table 2.

TABLE 2

| | Operating Conditions | | | Wet Cake Data | | | | |
|---|---|---|---|---|---|---|---|---|
| Example No. | Act Temp °C. | Actual Residence time min | Actual Ca(OH)$_2$ dose g/L | Wet Cake Total CN (Bi) mg/kg | Am CN(Bi) mg/kg | Phosphine by Acid mg/kg | Phosphine flux µg/min – m$^2$ | HCN flux µg/min – m$^2$ |
| 1 | 168 | 65 | 39 | 42 | <2.40/31.6 | 1123 | 38 | <6 |
| 2 | 168 | 49 | 23 | 65 | 65 | 1537 | 57 | 9 |
| 3 | 174 | 77 | 53 | 29 | 29 | 112 | <8 | <6 |
| 4 | 172 | 53 | 58 | 27 | 16.7/32.7 | 73 | <8 | <6 |
| 5 | 213 | 58 | 31 | 10 | 4 | 40 | <8 | <6 |
| 6 | 211 | 40 | 29 | 21 | 21 | 86 | <8 | <6 |
| 7 | 212 | 56 | 47 | 8 | 4 | 37 | <8 | <6 |
| 8 | 212 | 40 | 53 | 13 | 4.84/18.1 | 36 | <8 | <6 |
| 9 | 192 | 55 | 39 | 18 | 11 | 112 | 9 | <6 |
| 10 | 192 | 56 | 35 | 76 | 69 | 110 | 27 | <6 |
| 11 | 193 | 56 | 37 | 11 | 4 | 126 | <8 | <6 |

Filtrate data corresponding for the above examples is given in Table 3.

TABLE 3

| | Effluent Filtrate | |
| --- | --- | --- |
| Example No. | Total Cyanide (Bi) mg/L | Amenable Cyanide (Bi) mg/L |
| 1 | 0.5 | 11.3 |
| 2 | 0.86 | 1 |
| 3 | 181 | 181 |
| 4 | 7.8 | 14.3/1.24 |
| 5 | 15 | 15 |
| 6 | 15 | 15 |
| 7 | 19 | 19 |
| 8 | 22.4 | 22.4 |
| 9 | 6 | 6 |
| 10 | 10 | 10 |
| 11 | 11 | 11 |

A temperature of at about 200° C. was needed to bring the cyanide content of the wet cake into the compliance zone so that an operating temperature of 200° C. would be required to achieve close to a minimal phosphine flux. It has been estimated that, if the phosphine flux is less than 612 $\mu$g/min-$m^2$, the phosphine concentration in the ambient air at the berm of a typical landfill will be less than the allowable limit of 0.3 ppmv. Because virtually all the elemental phosphorus has been removed from the wet cake, phosphine generation from the wet cake solids stems from residual phosphides. An operating temperature of about 200° C. or more would ensure a low level of phosphides in the wet cake as measured by the acid test.

An extended run was preformed over a period of ~4 days in which run conditions were held constant at the following average values:

| | |
| --- | --- |
| Reactor temperature | 210° C. |
| Pressure | 299 psig |
| Actual residence time (corrected for water expansion) | 35 min |
| Ca(OH)$_2$ (100% basis) dosage | 78 g/L of waste feed |

Solids were discharged (blowndown) from the bottom of the reactor about every 24 hours. During this test, which can be regarded as typifying preferred anoxic run conditions, samples of effluent slurry were taken at 6 hr time intervals during the test and filtered without pH adjustment.

This experiment showed that:

1. The total cyanide target of 590 mg/kg in the wet cake is easily met.
2. Virtually all the cyanide present in the cake is amenable cyanide.
3. The amenable cyanide in the cake is ~20 ppm which met the target of <30 ppm.
4. The TCLP limits for all metals on the wet cake for which the mineral processing industry is regulated were typically met without pH adjustment of the treated slurry.
5. Total amenable cyanide in the filtrate ranged from 2.0 to 12.5 mg/L.
6. All limits were met for the UTS metals in the filtrate without pH adjustment.

Wet Air Oxidation (WAO) Modification

Figure 5:
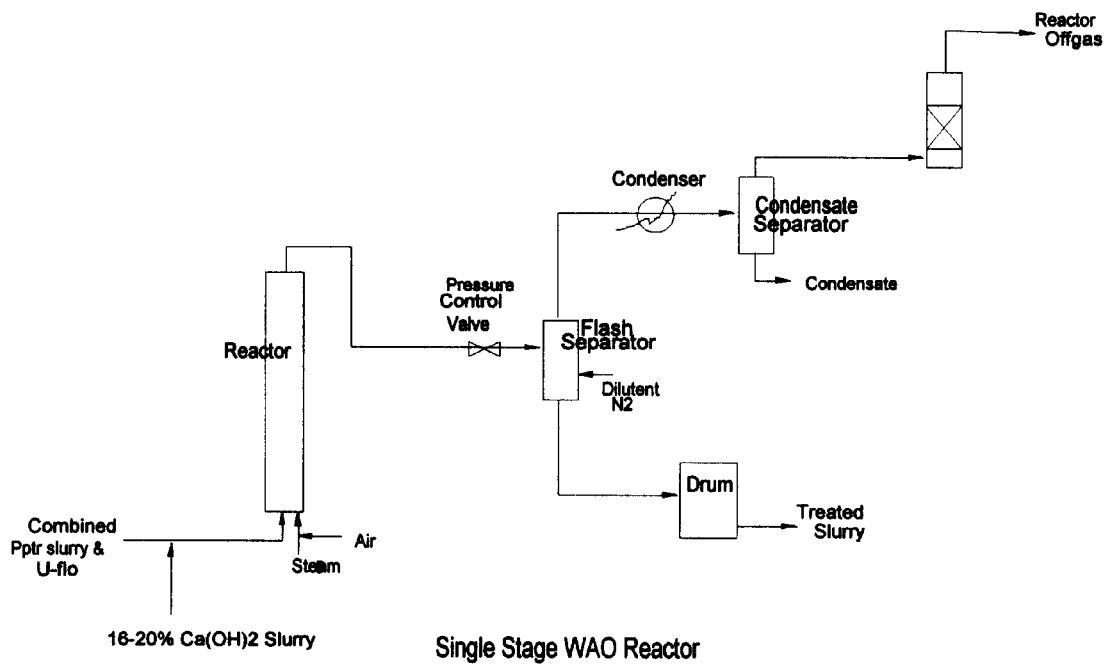
FIG. 5 shows a flowsheet for one embodiment of the WAO modification.

In the WAO modification air is introduced into the reactor in addition to the lime and steam. A diagram of the configuration used for the WAO pilot tests is shown in FIG. 5. The reactor was 18 ft high, 3.433 in inside diameter reactor (9 gallon volume). Nominal 60 and 90 min residence times were examined. Typical feed flow rates were 9 and 6 gallons per hour, respectively. A few tests were made with a nominal 30 minute residence time with a corresponding 16 gallon per hour feed rate.

The lime and combined slurry were premixed near the reactor bottom and entered the reactor through a common nozzle. The air and steam were premixed near the reactor bottom and entered the reactor through a common nozzle discharging vertically upward. Reactor 'blowdown' of solids as mentioned for the anoxic modification was also practiced in the WAO modification. The slurry along with gas generated in the reactor exited the top of the reactor and entered the flash separator through the pressure control valve. Because the concentrations of hydrogen and phosphine in the gas phase were already below the set limit, <25% LEL, diluent nitrogen was not required.

Figure 6:
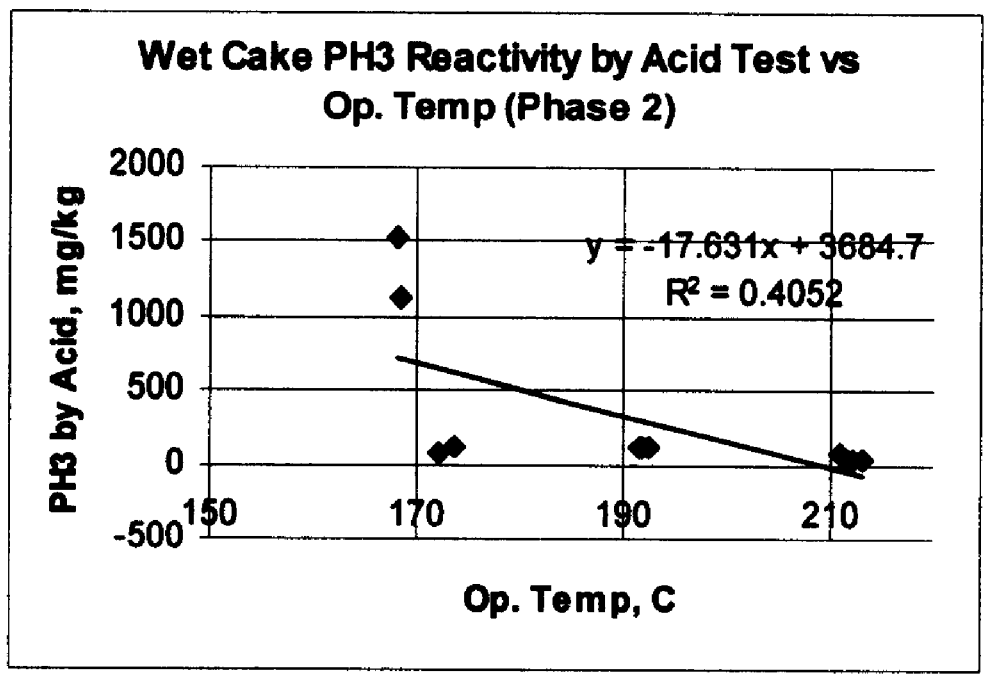
FIG. 6 shows wet cake phosphine reactivity by the acid test vs. temperature for the WAO modification.

Wet cake phosphine reactivity vs temperature is shown in FIG. 6. For the temperature range investigated (161–219° C.), the wet cake flux was independent of temperature, being below detection, i.e., <8 ug/min-$m^2$. Thus, phosphides are attacked by WAO operation at relatively low temperatures compared to the anoxic process.

An extended run was preformed over a period of ~8 days in which run conditions were held constant and solids were discharged (blowndown) periodically from the bottom of the reactor. The test conditions are summarized below:

| | |
| --- | --- |
| Reactor temperature | 200° C. |
| Pressure | 486 psig |
| Actual residence time (corrected for water expansion) | 38 min |
| Ca(OH)$_2$ (100% basis) dosage | 69 g/L of waste feed |
| Oxygen concentration in the exit gas | 17 vol % |

During a test, which lasted for 24 h and can be regarded as typifying a preferred WAO condition, samples of reactor effluent slurry were taken every 6 hr during the test and filtered without pH adjustment. These were cakes directly from the reactor and had not had the benefit of (a) pH adjustment or (b) stabilization with cement or other stabilient and a such represent conservative results.

The data showed that total cyanide target of 590 mg/kg was easily met; the amenable cyanide target of 30 mg/kg was met, with the exception of one replicate analysis; and TCLP cadmium on the wet cake was out of compliance without the benefit of subsequent lime addition. The TCLP limits were met for all other metals on which the mineral processing industry is regulated.

Figure 7:
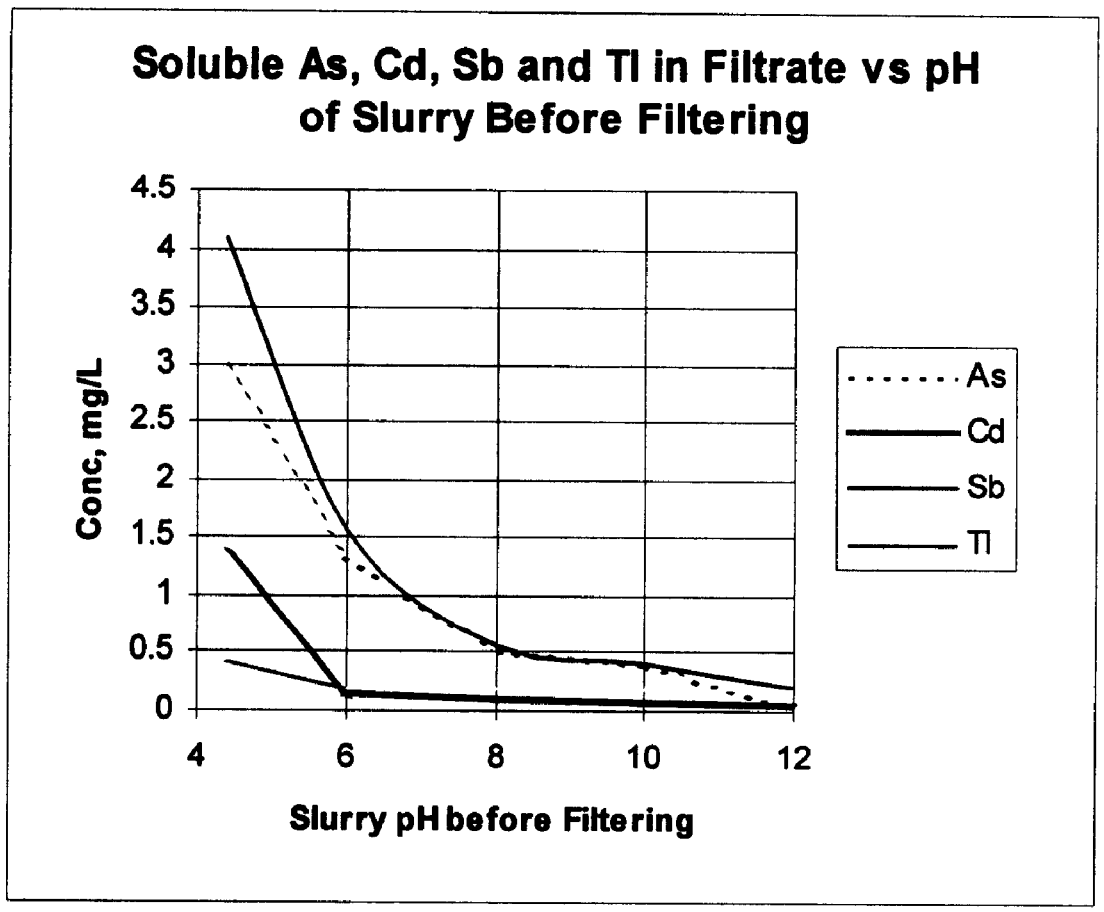
FIG. 7 shows the concentration of some soluble metals vs. pH for the WAO modification.

Analysis of the filtrates showed that total and amenable cyanide slightly exceed the UTS limits of 1.2 and 0.86 mg/L, respectively, so post treatment may be required. Elevated values of As, Cd, Sb and Tl were observed in the filtrate. However, as shown in FIG. 7, these metals can be brought into compliance by pH adjustment.

Anoxic Step Followed by Mild WAO

In this process modification, the first stage is an anoxic step followed by a mild oxidative step. The idea is that the first stage anoxic step destroys phosphorus, cyanides and much of the phosphides and that the second stage destroy the remaining phosphides and any potential odor without solublizing UTS metals.

Three categories of mild oxidative conditions were explored: (a) pressure oxidation (mild WAO), (b) hydrogen peroxide treatment and (c) atmospheric air stripping or sparging. The main difference between these lies in the phosphine head space reactivity. Pressure oxidation had the lowest head space reactivity (usually <0.5 ppm) and also controlled the selenium level to the 0–0.3 ppm range. The advantage of this two-stage process is that milder conditions can be used in the anoxic and WAO steps to achieve low levels of phosphides in the wet cake without solubilizing the metals.

Having described the invention, we now claim the following and their equivalents.

What is claimed is:

1. A process for treating a waste slurry generated in the electric furnace production of phosphorus, the process comprising the steps of:
   a) heating a mixture of the waste slurry and alkali, the waste slurry comprising one or more materials selected from the group consisting of UTS metals, cyanides, elemental phosphorus, and phosphides to produce a treated slurry;
   b) cooling the treated slurry and separating the gases formed;
   c) treating the gases to remove phosphine;
   d) if necessary, adjusting the pH of the treated slurry to at least 11; and
   e) filtering the treated slurry to produce a wet cake and a filtrate:
      in which step a) is carried out in the absence of oxygen.

2. The process of claim 1 in which the pH is maintained above 7 during step a).

3. The process of claim 2 in which the alkali comprises calcium hydroxide.

4. The process of claim 2 in which the gases formed in step b) comprise phosphine and hydrogen, and the gases are burned in a combustor.

5. The process of claim 2 in which the alkali in step a) is equivalent to 1 to 7 pounds of calcium hydroxide per pound of phosphorus present in the waste slurry; step a) is carried out at a temperature of about 160° C. to 240° C.; and the pH of the treated slurry following step a) is greater than 7.0.

6. The process of claim 5 in which the alkali comprises calcium hydroxide.

7. The process of claim 6 in which the gases formed in step b) comprise phosphine and hydrogen, and the gases are burned in a combustor.

8. The process of claim 6 in which the pH of the treated slurry is adjusted to at least about 12 in step d).

9. The process of claim 1 in which:
   the wet cake passes regulatory requirements of EPA SW-846 Method 1030, cyanide content, and leachable UTS metals;
   ambient air over the wet cake meets the ambient air requirements for phosphine and hydrogen cyanide; and
   the filtrate is below regulatory requirements with respect to the UTS metals.

10. The process of claim 1 in which the waste slurry comprises UTS metals, cyanides, elemental phosphorus, and phosphides.

11. A process for treating a waste slurry generated in the electric furnace production of phosphorus, the process comprising the steps of:
   a) heating a mixture of the waste slurry and alkali, the waste slurry comprising one or more materials selected from the group consisting of UTS metals, cyanides, elemental phosphorus, and phosphides to produce a treated slurry;
   b) cooling the treated slurry and separating the gases formed;
   c) adjusting the pH of the treated slurry to at least 11; and
   d) filtering the treated slurry to produce a wet cake and a filtrate: in which step a) is carried out in the presence of oxygen.

12. The process of claim 11 in which the pH is maintained below 7 during step a).

13. The process of claim 12 in which the alkali comprises calcium hydroxide.

14. The process of claim 12 in which the gases are treated with a scrubber, with an absorber, or with a combustor.

15. The process of claim 12 in which the alkali in step a) is equivalent to 1 to 7 pounds of calcium hydroxide per pound of phosphorus present in the waste slurry; step a) is carried out at a temperature of about 150° C. to 230° C.; and the pH of the treated slurry following step a) is about 2.0 to 7.0.

16. The process of claim 15 in which the alkali comprises calcium hydroxide.

17. The process of claim 16 in which the pH of the filtrate is adjusted to at least about 12.

18. The process of claim 11 in which:
   the wet cake passes regulatory requirements of EPA SW-846 Method 1030, cyanide content, and leachable UTS metals;
   ambient air over the wet cake meets the ambient air requirements for phosphine and hydrogen cyanide; and
   the filtrate is below regulatory requirements with respect to the UTS metals.

19. The process of claim 11 in which the waste slurry comprises UTS metals, cyanides, elemental phosphorus, and phosphides.

20. A process for treating a waste slurry generated in the electric furnace production of phosphorus, the process comprising, in order, the steps of:
   a) heating a mixture of the waste slurry and alkali in the absence of oxygen, the waste slurry comprising one or more materials selected from the group consisting of UTS metals, cyanides, elemental phosphorus, and phosphides to produce a treated slurry;
   b) heating the treated slurry in the presence of oxygen;
   c) adjusting the pH of the treated mixture to at least 11; and
   d) filtering the treated slurry to produce a wet cake and a filtrate.

21. The process of claim 20 in which the pH is maintained above 7 during step a).

22. The process of claim 21 in which the alkali comprises calcium hydroxide.

23. The process of claim 21 in which the alkali in step a) is equivalent to 1 to 7 pounds of calcium hydroxide per pound of phosphorus present in the waste slurry, step a) is carried out at a temperature of about 150° C. to 200° C.; and step b) is carried out at a temperature of about 150° C. to 200° C.

24. The process of claim 23 in which the alkali comprises calcium hydroxide.

25. The process of claim 21 in which the pH of the treated slurry is adjusted to at least about 12 in step c).

26. The process of claim 20 in which:

the wet cake passes regulatory requirements of EPA SW-846 Method 1030, cyanide content, and leachable UTS metals;

ambient air over the wet cake meets the ambient air requirements for phosphine and hydrogen cyanide; and the filtrate is below regulatory requirements with respect to the UTS metals.

27. The process of claim 20 in which the waste slurry comprises UTS metals, cyanides, elemental phosphorus, and phosphides.

* * * * *